United States Patent
Young

(10) Patent No.: US 9,511,659 B2
(45) Date of Patent: Dec. 6, 2016

(54) METHOD AND APPARATUS FOR LAWN CARE

(76) Inventor: Steven Young, Minneapolis, MN (US)

(*) Notice: Subject to any disclaimer, the term of this patent is extended or adjusted under 35 U.S.C. 154(b) by 114 days.

(21) Appl. No.: 12/694,726

(22) Filed: Jan. 27, 2010

(65) Prior Publication Data
US 2010/0187029 A1    Jul. 29, 2010

Related U.S. Application Data

(60) Provisional application No. 61/206,340, filed on Jan. 28, 2009.

(51) Int. Cl.
*B60K 6/46* (2007.10)
*A01D 69/02* (2006.01)

(52) U.S. Cl.
CPC .............. *B60K 6/46* (2013.01); *A01D 69/025* (2013.01); *B60Y 2200/223* (2013.01); *Y02T 10/6217* (2013.01)

(58) Field of Classification Search
USPC ............................ 180/65.1–65.8, 14.2, 11–13
See application file for complete search history.

(56) References Cited

U.S. PATENT DOCUMENTS

| | | | |
|---|---|---|---|
| 4,870,811 A * | 10/1989 | Steele .............................. | 56/10.5 |
| 6,591,593 B1 | 7/2003 | Brandon et al. | |
| 6,713,889 B2 | 3/2004 | Dietz et al. | |
| 6,724,100 B1 * | 4/2004 | Gabriel .......................... | 307/9.1 |
| 6,856,035 B2 | 2/2005 | Brandon et al. | |
| 6,938,400 B2 * | 9/2005 | Fillman et al. ................. | 56/10.6 |
| 6,987,328 B2 * | 1/2006 | Osborne ......................... | 290/1 R |
| 7,017,327 B2 * | 3/2006 | Hunt et al. ..................... | 56/14.7 |
| 7,141,321 B2 | 11/2006 | McArthur et al. | |
| 7,231,994 B2 | 6/2007 | Buglione et al. | |
| 7,328,563 B1 * | 2/2008 | Anderson et al. ............. | 56/11.9 |
| 2005/0029816 A1 | 2/2005 | Brandon et al. | |
| 2006/0219448 A1 | 10/2006 | Grieve et al. | |
| 2007/0151782 A1 | 7/2007 | Buglione et al. | |
| 2007/0158120 A1 | 7/2007 | Lee et al. | |
| 2007/0282495 A1 | 12/2007 | Kempton et al. | |
| 2008/0052145 A1 | 2/2008 | Kaplan et al. | |

OTHER PUBLICATIONS

Danes, Lisa, Jan. 25, 2008, (http://www.greenindustrypros.com/article/10260925/environmentally-friendly-lawn-care-franchise-launched).*

* cited by examiner

*Primary Examiner* — Katy M Ebner
(74) *Attorney, Agent, or Firm* — Merchant & Gould P.C.

(57) ABSTRACT

A method for caring for a lawn and an apparatus for providing lawn care are provided. The method includes steps of powering an electrically powered lawn care device by a electric power source, wherein the electric power source is provided as part of an electrically powered transportation vehicle, and treating the lawn by using the electrically powered lawn care device. The apparatus includes: (a) a hybrid vehicle having an electric motor for driving the hybrid vehicle, and an electric power source for powering the electric motor; (b) a trailer constructed to attach to the hybrid vehicle so that the trailer can be pulled by the hybrid vehicle; and (c) electrically powered lawn care equipment constructed to fit within the trailer, and wherein the electric power source is constructed to power the electrically powered lawn care equipment.

8 Claims, 1 Drawing Sheet

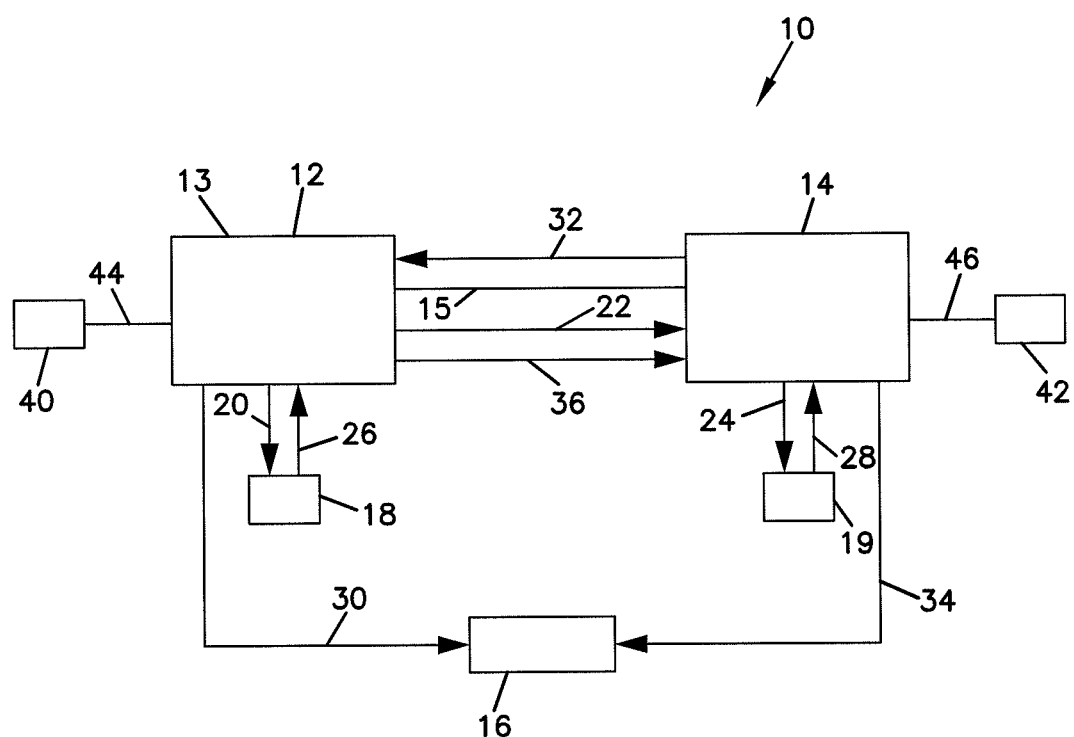

METHOD AND APPARATUS FOR LAWN CARE

This application claims priority, to the extent appropriate, to U.S. Application Ser. No. 61/206,340 that was filed with the United States Patent and Trademark Office on Jan. 28, 2009. The entire disclosure of U.S. Application Ser. No. 61/206,340 is incorporated herein by reference.

FIELD OF THE DISCLOSURE

The disclosure relates to a method for lawn care and to an apparatus for lawn care. In particular, the method and apparatus provide for the use of an electrically powered transportation vehicle for transporting lawn care equipment from one location to another, and for powering the lawn care equipment.

BACKGROUND

It is generally recognized that small, two-stroke and four stroke engines used in conventional lawn care equipment cause a large amount of pollution and contribute to ground-level ozone concentrations. According to one report, traditional gas-powered lawn mowers are responsible for 5% of the air pollution in the United States, according to the United States Environmental Protection Agency. The same publication reports that one gas mower running for an hour emits the same amount of pollutants as eight new cars driving 55 mph for the same amount of time, according to the Union of Concerned Scientists. Another publication contends that a traditional gas-powered lawn mower produces as much air pollution as 43 new cars each being driven 12,000 miles. Furthermore, it is generally recognized that small, gas-powered engines are a major contributor to noise pollution and have been known to cause ear damage.

Alternatives to traditional gas-powered lawn mowers are available. Manual and battery powered reel mowers are available from The Scotts Company, LLC, Brill, and Sunlawn. Corded electric and battery powered rotary lawn mowers are available from Black & Decker, Cub Cadet, and Neuton. Remington offers the PowerMower lawn mower which can switch between battery powered and corded electric modes.

SUMMARY

A method for caring for a lawn is provided according to the disclosure. The method includes steps of powering an electrically powered lawn care device by a electric power source, wherein the electric power source is provided as part of an electrically powered transportation vehicle, and treating the lawn by using the electrically powered lawn care device.

An apparatus for providing lawn care service is provided according to the disclosure. The apparatus includes:
  (a) a hybrid vehicle having an electric motor for driving the hybrid vehicle, and an electric power source for powering the electric motor;
  (b) a trailer constructed to attach to the hybrid vehicle so that the trailer can be pulled by the hybrid vehicle; and
  (c) electrically powered lawn care equipment constructed to fit within the trailer, and wherein the electric power source is constructed to power the electrically powered lawn care equipment.

BRIEF DESCRIPTION OF THE DRAWINGS

FIG. 1 is a diagram of the apparatus for lawn care.

DETAILED DESCRIPTION

Electrically powered transportation vehicles are vehicles that can be relied upon for transporting people on streets and highways by utilizing an electric drive motor powered by an electric power source. An electric drive motor refers to an electric motor that can drive or propel the vehicle. An example of an electric power source that can power a drive motor is a battery that can be referred to as a drive battery. Examples of electrically powered transportation vehicles include vehicles that can be classified as electric vehicles or hybrid vehicles. In general, an electric vehicle refers to a vehicle having a drive battery that is charged by a power source not on board the vehicle. For example, an electric vehicle can be plugged into an outlet to charge the drive battery. A hybrid vehicle refers to a vehicle that includes a drive battery and an internal combustion engine that are both on board the vehicle. The drive battery can be charged by the internal combustion engine, by an external power source, or by both an internal combustion engine and an external power source. In addition, electrically powered transportation of vehicles can include a generator for converting kinetic energy to potential energy where it is stored in the drive battery. Many hybrid automobiles commercially available today include a drive battery that powers the electric drive motor and is charged by the internal combustion engine and by a generator. Vehicles that are exclusively driven by an internal combustion engine, and that do not provide for the generation and storage of electrical energy in a drive battery, are not considered electrically powered transportation vehicles. It should be understood that the reference to a drive battery as a power source for driving an electrically powered transportation vehicle refers to a battery that is constructed to power an electrical drive motor that drives the vehicle. A conventional 12 volt battery used for powering a starter motor is not considered a battery constructed to power an electric drive motor that drives the vehicle.

Electrically powered transportation vehicles can be used to provide an electric power source for powering electrically powered lawn care equipment, and for pulling a trailer that transports electrically powered lawn care equipment. A lawn care service provider can use an electrically powered transportation vehicle to haul electrically powered lawn care equipment from one location to another location, and to power the electrically powered lawn care equipment by utilizing the electric power source provided on board the vehicle. An electrically powered transportation vehicle can be considered a vehicle that requires a government registration in order to drive the vehicle on public roads.

Hybrid vehicles can generally be characterized as vehicles having a dual powertrain that derives power from an internal combustion engine and an electric motor. In general, liquid fuel (e.g., gasoline) is the power source for the internal combustion engine and the battery is the power source for the electric motor. The battery can be charged by an internal combustion engine, an external power source, or both an internal combustion engine and an external power source.

Hybrid vehicles can include hybrid automobiles and hybrid commercial vehicles, such as pickup trucks, used by contractors or utility companies. Exemplary hybrid vehicles are disclosed by U.S. Pat. No. 6,724,100, U.S. Patent Publication No. US2005/0029816, and U.S. Pat. No. 6,856, 035. Exemplary commercial vehicles are disclosed by U.S. Patent Publication No. US2007/0158120, U.S. Patent Publication No. US2007/0151782, and U.S. Pat. No. 7,231,994.

Electrically powered lawn care equipment is available commercially. In general, electrically powered lawn care equipment and can be powered by the electric power source of the electrically powered transportation vehicle. The reference to an electric power source of an electrically powered transportation vehicle generally refers to the battery or batteries in the electrically powered transportation vehicle that store energy and makes the energy available for driving the vehicle. The internal combustion engine of a hybrid vehicle can be used to charge the battery of the hybrid vehicle. An exterior electric source (e.g., a household outlet) can be used to charge the battery of the hybrid vehicle and the electric vehicle.

Electrically powered lawn care equipment refers to lawn care equipment that is driven by an electric motor. Typically, the lawn care equipment includes either a cord for extension to an electric power source such as a household electrical outlet, or a battery for cordless operation. Electrically powered lawn care equipment does not typically include an internal combustion engine for powering the equipment. However, the electrically powered lawn care equipment can be provided with or without an internal combustion engine, as desired. Typically, the presence of an internal combustion engine would add weight (and cause pollution) and would likely be less desirable. The phrase "electrically powered lawn care equipment" can include various equipment or devices that lawn care service providers use to care for and maintain a customer's lawn, such as, for example, lawn mowers, lawn trimmers, hedge trimmers, leaf blowers, and lawn aerators. While a hedge trimmer is not necessarily used on grass, it can be considered a type of lawn care device because it is used by lawn care service providers who are caring for a lawn.

Electrically powered lawn care equipment available in the United States is commonly powered by 120V AC current which is a standard domestic voltage. Lawn care equipment can be manufactured, if desired, to operate based on alternative currents. The battery source of a hybrid vehicle is typically designed to operate at a higher voltage. Furthermore, the current may be direct rather than alternating. Accordingly, the electrically powered lawn care equipment can be constructed to operate using a higher voltage (e.g., a voltage greater than 130V), and can be constructed to work on alternating current or direct current. Furthermore, a converter can be provided to reduce the voltage to a desired level, and to convert the current from direct current to alternating current or vice versa, as desired. For example, if the lawn care equipment operates based on 120V AC, a converter can be provided to reduce a battery source from, for example, 201V DC (the voltage of a Toyota Prius) to 120V AC.

Now referring to FIG. 1, an exemplary diagram of an apparatus for providing lawn care is shown at reference number 10. The lawn care apparatus 10 includes an electrically powered transportation vehicle 12, a trailer 14, and lawn care equipment 16. The electrically powered transportation vehicle 12 is a hybrid vehicle 13 but can, if desired, be provided as a purely electrically powered vehicle. The hybrid 13 can be provided as a hybrid automobile or as a hybrid commercial vehicle. The hybrid vehicle 13 includes an electric motor that drives the electrically powered transportation vehicle, and a battery that powers the electric motor. The hybrid vehicle 13 includes a combustion engine to drive the engine and to charge the battery. The trailer 14 can be provided hitched 15 to the hybrid vehicle 13, and the lawn care equipment 16 can be provided within the trailer 14 for storage and transportation. Exemplary lawn care equipment include lawn mowers, grass trimmers, lawn edgers, hedge trimmers, leaf blowers, and lawn aerators. In general, the operator of the electrically powered transportation vehicle 12 can drive the electrically powered transportation vehicle 12 and trailer 14 to various locations where customers require lawn care. The electrically powered lawn care equipment 16 can be provided within the trailer 14, and utilized to provide lawn care services at the various locations.

A converter 18 can be provided as part of the electrically powered transportation vehicle 12 or a converter 19 can be provided as part of the trailer 14. High voltage direct current can be supplied to the converter 18 from the battery in the electrically powered transportation vehicle 12 via the high voltage line 20. Alternatively, high voltage direct current can be supplied to the converter 19 from the battery in the electrically powered transportation vehicle 12 via the high voltage line 22 from the vehicle 12 to the trailer 14 and the high voltage line 24 from the trailer 14 to the converter 19. In general, high voltage direct current can be supplied to the converter 18 from the vehicle battery, and returned to the vehicle 12 as low voltage alternating current via line 26 to provide a current sufficient to power the lawn care equipment 16. Similarly, high voltage direct current line 24 can be supplied to the converter 19, and returned to the trailer 14 as low voltage alternating current via line 28 to provide a current sufficient to power the lawn care equipment 16. Various alternative arrangements are available for powering the lawn care equipment 16. The selection of the arrangement can depend, in part, on where one chooses to place outlets for powering the lawn care equipment 16. For example, the lawn care equipment 16 can be powered via the line 30 from the vehicle 12. The line 30 can provide the low voltage alternating current from the line 26. Alternatively, the line 30 can provide low voltage alternating current from the line 28 wherein the low voltage alternating current can be supplied from the trailer 14 to the vehicle 12 via the low voltage alternating current line 32. Similarly, the lawn care equipment 16 can be powered from the trailer 14 via the line 34. The line 34 can provide low voltage alternating current obtained via the line 28 or via the line 26 where the low voltage alternating current is conveyed from the vehicle 12 to the trailer 14 via the low voltage alternating current line 36. The vehicle 12, the trailer 14, the converter 18, or the converter 19 can include an outlet for receiving a plugged cord connected to the lawn care equipment 16. Furthermore, it should be understood that FIG. 1 is not a circuit diagram, and that one skilled in the art would understand how to build circuits to achieve the desired results.

Battery chargers 40 and 42 can be provided for charging batteries that can be used to power the lawn care equipment 16. The battery charger 40 can be connected to the vehicle 12 via the line 44, and the battery charger 42 can be connected to the trailer 14 via the line 46. Batteries can be charged using the battery charger 40, the battery charger 42, or a combination thereof, to charge batteries for powering the lawn care equipment 16. The lawn care equipment can be corded, battery powered, or both. In the case where the lawn care equipment is battery powered, the battery can be removable and replaceable. As a result, one can simply remove a drained battery and replace it with a charged battery, and then charge the drained battery via the battery charger 40 or 42. Alternatively, battery powered lawn care equipment can be utilized where the battery is not removable. In such a situation, the lawn care equipment can simply be charged using the charger 40 or the charger 42 when the lawn care equipment is not in use. Utilizing battery powered (and not corded) lawn care equipment can be useful when trying to reach areas that may be distant from the vehicle and trailer.

In general, there is a desire to provide commercial lawn care services that utilize electrically powered lawn care equipment in order to reduce air pollution and to reduce noise pollution. While it is often possible for a lawn care service provider to plug electrical lawn care equipment into an outlet at a customer home, lawn care service providers are often reluctant to do this because it amounts to using the customer's electricity service to power their equipment. Furthermore, customers expect that a lawn care service provider will provide their own power for driving their equipment. In addition, there are often locations where there is no available municipal electric power source.

The foregoing description, which has been disclosed by way of the above discussion and the drawings, addresses embodiments of the present disclosure encompassing the principles of the present invention. The methods maybe changed, modified and/or implemented using various types of equipment and arrangements. Those skilled in the art will readily recognize various modifications and changes which maybe made to the described methods and equipment without strictly following the exemplary embodiments illustrated and described herein, and without departing from the scope of the present invention.

I claim:

1. A method for caring for multiple lawns, the method comprising:
    (a) powering an electrically powered lawn mower using a first battery charged by an electric power source, wherein the electric power source is provided as part of a hybrid vehicle, the hybrid vehicle comprises an electric drive motor, a drive battery that powers the electric drive motor, and an internal combustion engine that charges the drive battery, and the hybrid vehicle is separate from the electrically powered lawn mower;
    (b) treating a first lawn by cutting grass using the electrically powered lawn mower;
    (c) treating the first lawn by cutting grass using an electrically powered grass trimmer powered by a second battery charged by the electric power source provided as part of the hybrid vehicle;
    (d) treating the first lawn by blowing air over the lawn using an electronically powered leaf blower powered by a third battery charged by the electric power source provided as part of the hybrid vehicle;
    (e) driving the hybrid vehicle from the first lawn to a second lawn;
    (f) charging at least the first battery from energy obtained from the internal combustion engine during the step of driving; and
    (g) treating the second lawn using the electrically powered lawn mower powered by the first battery charged by the electric power source provided as part of the hybrid vehicle.

2. A method for caring for multiple lawns according to claim 1, further comprising edging the first lawn with an electrically powered lawn edger using a battery charged by the electric power source provided as part of the hybrid vehicle.

3. A method for caring for multiple lawns according to claim 1, further comprising aerating the first lawn with an electrically powered lawn aerator using a battery charged by the electric power source provided as part of the hybrid vehicle.

4. A method for caring for multiple lawns according to claim 1, further comprising treating the first lawn with an electrically powered lawn care device that runs off of 120V AC current.

5. A method for caring for multiple lawns according to claim 1, further comprising treating the first lawn with an electrically powered lawn care device that runs off of a current having a voltage greater than 130V.

6. A method for caring for multiple lawns according to claim 1, wherein the hybrid vehicle comprises an automobile and a trailer, wherein the lawn care devices are transported in the trailer.

7. A method for caring for a multiple lawns according to claim 1, wherein the hybrid vehicle comprises a generator that charges the drive battery by converting kinetic energy to potential energy.

8. A method for caring for multiple lawns according to claim 1, further comprising charging at least one of the second and third batteries during the step of driving.

* * * * *